United States Patent
Merah et al.

(10) Patent No.: US 8,857,696 B1
(45) Date of Patent: Oct. 14, 2014

(54) METHOD AND TOOL FOR FRICTION STIR WELDING

(71) Applicant: King Fahd University of Petroleum and Minerals, Dhahran (SA)

(72) Inventors: Nesar Merah, Dhahran (SA); Fadi A. A. Al-Badour, Dhahran (SA); Abdelrahman Nasr Shuaib, Dhahran (SA); Abdelaziz Bazoune, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/242,839

(22) Filed: Apr. 1, 2014

(51) Int. Cl.
*B23K 20/12* (2006.01)

(52) U.S. Cl.
CPC ......... *B23K 20/1265* (2013.01); *B23K 20/1245* (2013.01); *B23K 2201/14* (2013.01)
USPC .......................................... 228/2.1; 228/112.1

(58) Field of Classification Search
None
See application file for complete search history.

(56) References Cited

U.S. PATENT DOCUMENTS

| | | | |
|---|---|---|---|
| 3,144,710 A | | 8/1964 | Hollander et al. |
| 5,713,507 A * | | 2/1998 | Holt et al. .................. 228/112.1 |
| 6,237,835 B1 * | | 5/2001 | Litwinski et al. .......... 228/112.1 |
| 6,732,900 B2 | | 5/2004 | Hansen et al. |
| 7,097,091 B2 | | 8/2006 | Okamura et al. |
| 7,802,716 B2 | | 9/2010 | Nishikawa et al. |
| 7,954,691 B2 * | | 6/2011 | Roos et al. .................. 228/112.1 |
| 2004/0134971 A1 * | | 7/2004 | Narita et al. ............... 228/112.1 |
| 2009/0308582 A1 | | 12/2009 | Nagurny et al. |
| 2009/0308913 A1 * | | 12/2009 | Hall et al. ................... 228/112.1 |
| 2010/0084456 A1 * | | 4/2010 | Carter ......................... 228/112.1 |
| 2011/0000952 A1 | | 1/2011 | Takeshita et al. |
| 2012/0193401 A1 * | | 8/2012 | Hori et al. .................. 228/112.1 |
| 2012/0199331 A1 | | 8/2012 | Maurer et al. |
| 2012/0227890 A1 | | 9/2012 | Yamauchi et al. |
| 2013/0037601 A1 | | 2/2013 | Eller et al. |

FOREIGN PATENT DOCUMENTS

| | | | |
|---|---|---|---|
| JP | 11-320128 A | * | 11/1999 |
| JP | 2001-321965 A | * | 11/2001 |
| JP | 2003-001440 A | * | 1/2003 |
| JP | 2011-079031 A | * | 4/2011 |
| JP | 2011-206786 A | * | 10/2011 |
| JP | 2013-049072 A | * | 3/2013 |
| JP | 2013-202630 A | * | 10/2013 |
| WO | WO 01/62430 A1 | | 8/2001 |
| WO | WO 2012/171522 A | * | 12/2012 |

* cited by examiner

Primary Examiner — Kiley Stoner
(74) Attorney, Agent, or Firm — Richard C. Litman (57) ABSTRACT

The tool for friction stir welding is a tool adapted to operatively engage a tube and a tubesheet to form a sealed joint. The tool has two components. The first component is a shoulder having orthogonal faces for simultaneously engaging the sheet and the tube, the shoulder defining a bore terminating in an aperture at the junction of the faces. The second component is a stir welding probe that is insertable into the bore and has an end exiting the aperture at the end of the bore. A forging pressure urges the shoulder against the junction of the tube and tubesheet. The probe is rotated about its axis, penetrating the tube and tubesheet and generating heat through friction to weld the tube to the tubesheet, while the shoulder is rotated about the tube so that the weld forms a seal about the circumference of the tube.

10 Claims, 9 Drawing Sheets

METHOD AND TOOL FOR FRICTION STIR WELDING

BACKGROUND OF THE INVENTION

1. Field of the Invention

The invention relates to welding apparatus and methods, and particularly to a method and tool for friction stir welding for welding a tube and tubesheet to provide a sealed tube-tubesheet joint in, e.g., a heat exchanger tube assembly.

2. Description of the Related Art

Fluid leakage between the tube and tubesheet joints in heat transfer or heat exchanger equipment is undesirable and should be avoided at all costs. In tube and tubesheet joints, the mixing of two or more fluids, or leakage of hazardous fluids, can be extremely dangerous, and potentially catastrophic. Conventional welding techniques for seal or strength welding are based on fusion methods that may result in a number of defects, such as cracking and porosity formation. Such defects may result in a newly fabricated heat exchanger assembly being taken out of service in a very short period of time.

Thus, a method and tool for friction stir welding solving the aforementioned problems is desired.

SUMMARY OF THE INVENTION

The tool for friction stir welding is a tool adapted to operatively engage a tube and a tubesheet for friction stir welding with either flush or projecting tube ends. The tool has two components. The first component is a shoulder having orthogonal faces for simultaneously engaging the tubesheet and the tube, the shoulder defining a bore terminating in an aperture at the junction of the faces. The second component is a stir welding probe that is insertable into the bore and has an end exiting the aperture at the end of the bore. A forging pressure urges the shoulder against the junction of the tube and the tubesheet. The probe is rotated about its axis, penetrating the tube and tubesheet and generating heat through friction to weld the tube to the tubesheet, while the shoulder is rotated about the tube so that the weld forms a seal about the circumference of the tube. An expandable tube plug may be inserted into the tube during the friction stir welding process to maintain the integrity of the tube wall and prevent deformation of the tube.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
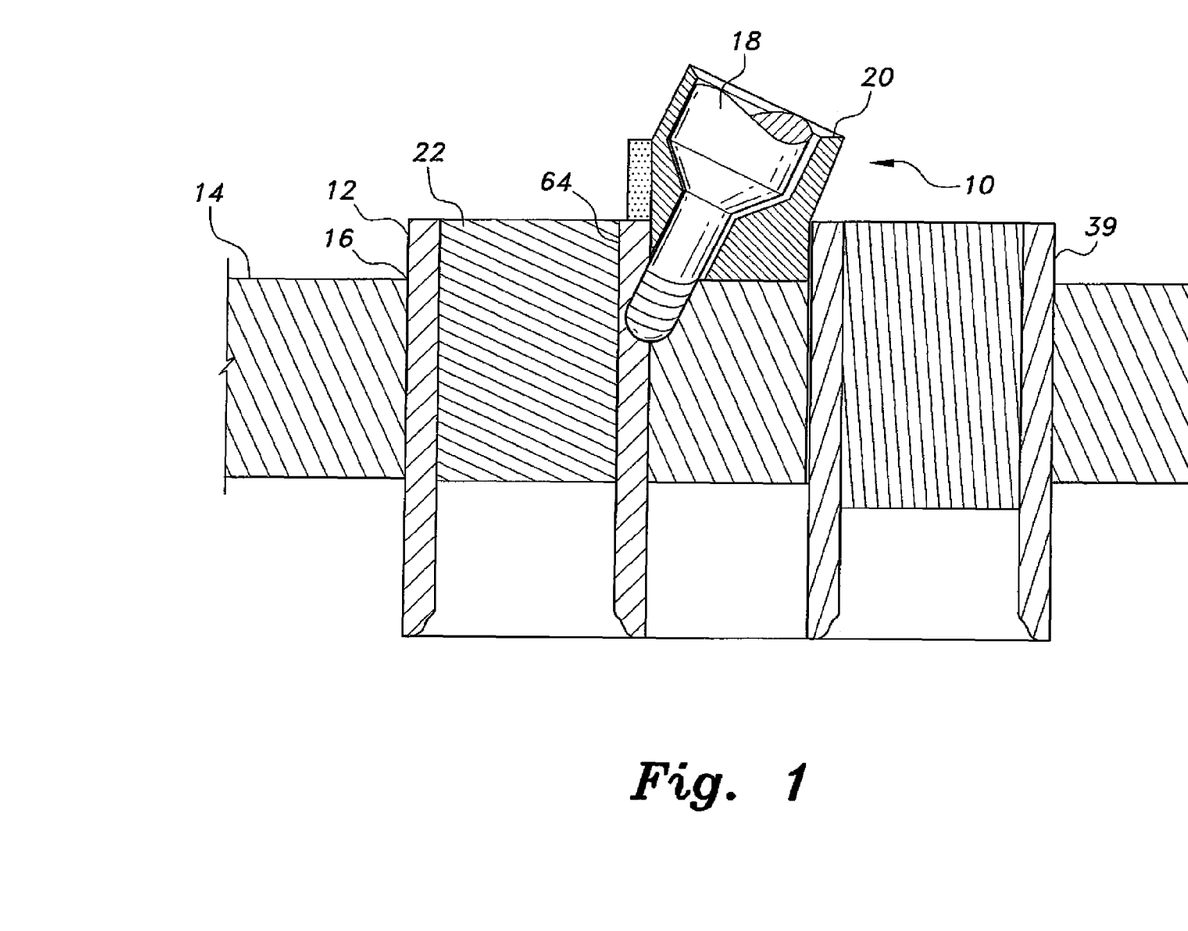
FIG. 1 is an environmental side view in section of a tool for friction stir welding according to the present invention.

Referring to FIG. 1, the tool for friction stir welding, designated generally as 10 in the drawings, is shown facilitating friction stir welding of a tube 12 and tubesheet 14 to form a secure joint at an intersection 16 of the tube 12 and tubesheet 14. The tool 10 is operatively connected to an associated welding apparatus, which facilitates friction stir welding about the tube 12 and tubesheet 14. The tool 10 includes a stir welding probe 18 for engaging the intersection 16 of the tube 12 and tubesheet 14, and shoulder 20 for receiving the stir welding probe 18 to guide the probe 18 against the tube 12 and tubesheet 14 and to provide a forging load to the weld on the tubesheet 14 during the friction welding process.

Figure 2:
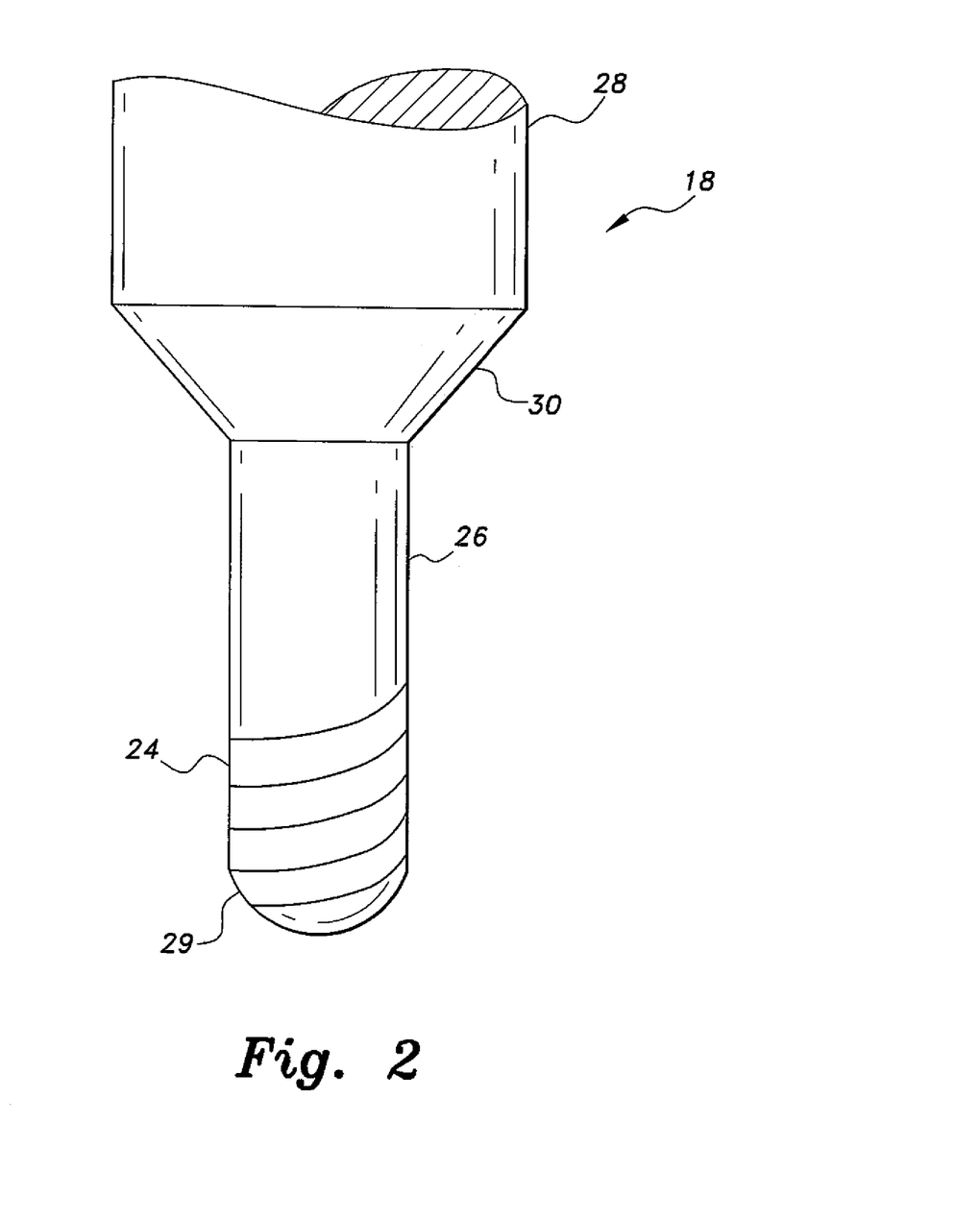
FIG. 2 is a partial side view of the stir welding probe of a tool for friction stir welding according to the present invention.

As shown in FIG. 2, the stir welding probe 18 includes a first portion 26 having a generally elongated, cylindrically shaped pin 24 extending therefrom, a second portion 28 defining a body 28 configured for operative connection to the associated welding apparatus, and a third portion 30 formed intermediate to the first portion 26 and second portion 28, having a generally frustoconical configuration. The second portion 28 of the probe 18 may be gripped by a spindle or chuck of the welding apparatus for rotation by an electric motor at a user-selectable speed.

The overall configuration of the stir welding probe 18 can both improve the quality of the weld formed by friction stir welding, as well as the maximize the possible welding speed. As shown, the pin 24 may include a plurality of helical threads 29 formed circumferentially along the pin 24. The threads 29 provide for better metal flow and lower welding forces.

Figure 3:
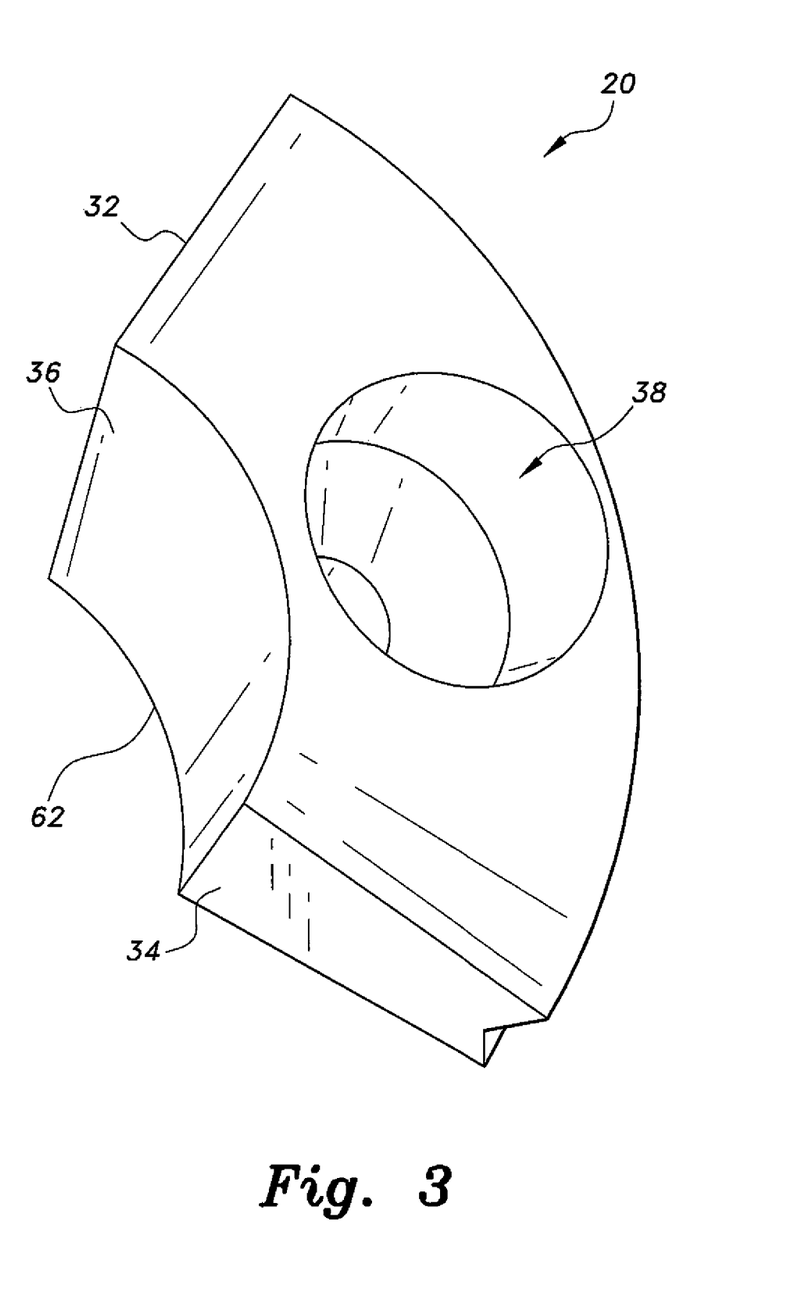
FIG. 3 is perspective view of the shoulder component of a tool for friction stir welding according to the present invention.
Figure 4:
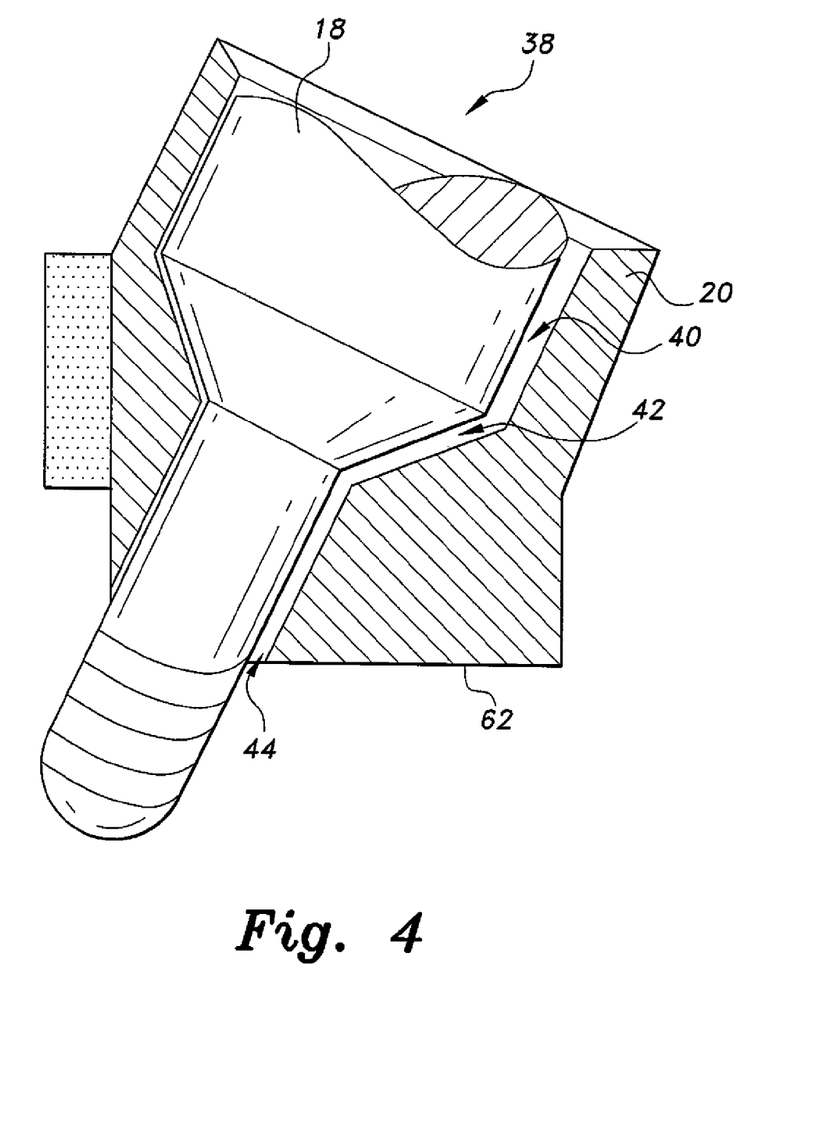
FIG. 4 is a side view in section of the tool for friction stir welding according to the present invention.

FIGS. 3 and 4 show the shoulder 20 of the tool 10. The shoulder 20 is configured to maintain a downward pressure or forging force on the tube 12 and tubesheet 14 during the welding process. The shoulder 20 has a separate axis of rotation from the probe 18. The shoulder 20 rotates around the axis of the tube 12 at a tangential speed equal to a preselected welding speed (V). The shoulder 20 includes a first end 32, a second end 34, and a generally thick wall, forming an arcuate inner face 36 adapted for abutting the outer wall 39 of a tube 12, and a bottom face 62 substantially orthogonal to the inner face 36 adapted for engaging the tubesheet 14. The body of the shoulder 20 may form substantially a 90° sector of a cylindrical shell. As shown, the shoulder 36 extends between the first end 32 and second end 34 and is adapted for positioning around the tube 12 to rotate around the tube outer wall 39 at a preselected speed $\omega_2$ during the friction stir welding process.

The shoulder 20 further includes bore 38 extending therein for receiving the stir welding probe 18 during the welding process. The bore 38 has a first opening 40 having a diameter adapted to receive the body 28 of the stir welding probe 18 therein. The shoulder 20 further has an aperture 44 at or near the junction of the inner face 36 and the bottom face 62 second opening 44. The pin 24 of the stir welding probe 18 is extendable through the aperture 44 during the welding process. The bore 38 also has a frustoconical recess 42 extending between the first opening 40 and the aperture 44 for receiving the body of the probe 18.

As shown in FIG. 1 and FIG. 4, when the shoulder 20 is in engaging relationship with the tubesheet 14 and tube 12, the aperture of the shoulder 20 is positioned proximate to the intersection 16 of the tube 12 and tubesheet 14 so that when the stir welding probe 18 is inserted into the bore 38, the pin 24 exits the aperture 44 and engages the tube 12 and tubesheet 14 proximate to that location to form a weld at the intersection 16. As shown, the bore 38 extends through the shoulder 20 at a preselected oblique angle $\Phi$ relative to the tube 12.

Figure 5:
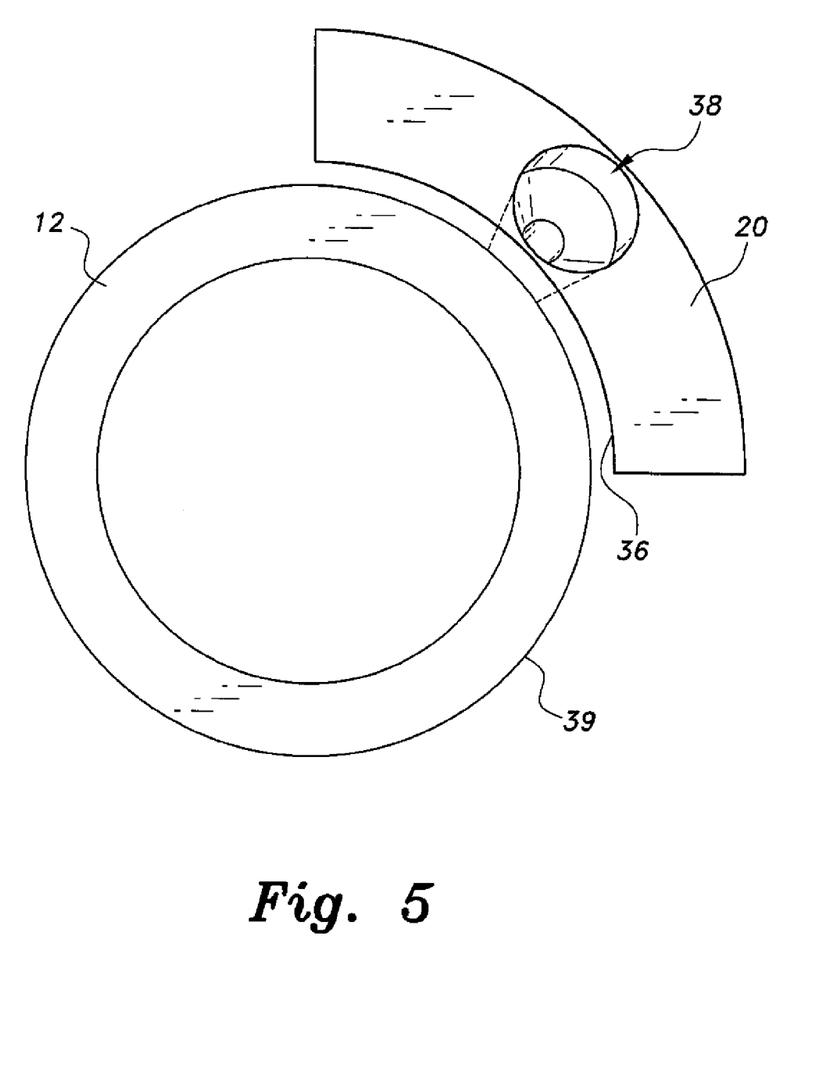
FIG. 5 is an environmental top view schematically illustrating the shoulder of the tool of FIG. 1 about to engage a tube.

As shown in FIG. 5, the shoulder 20 is configured for abutting against the outer wall 39 of the tube 12. As shown, the outer wall 39 of the tube 12 has a generally cylindrical shape. The inner face 36 of the shoulder 20 has a radius of curvature substantially equal to the radius of curvature of the tube 12 so that the shoulder 12 can rotate around the circumference of the tube 12, while maintaining pressure against the outer wall 39 and the tubesheet 14 during the stir friction welding process The shoulder 20 has a generally planar lower face 62 configured for operative engagement with the surface 54 of the tubesheet 14 so that when the shoulder 20 is in an engaged position with the tubesheet 14, it provides a preselected forging load on the surface 54 of the tubesheet 14 and intersection 16 to facilitate consolidated mixing of the tube 12 and tubesheet 14 materials during the stir welding process, as they are contacted by the pin 24 of the stir welding probe 18.

Figure 6:
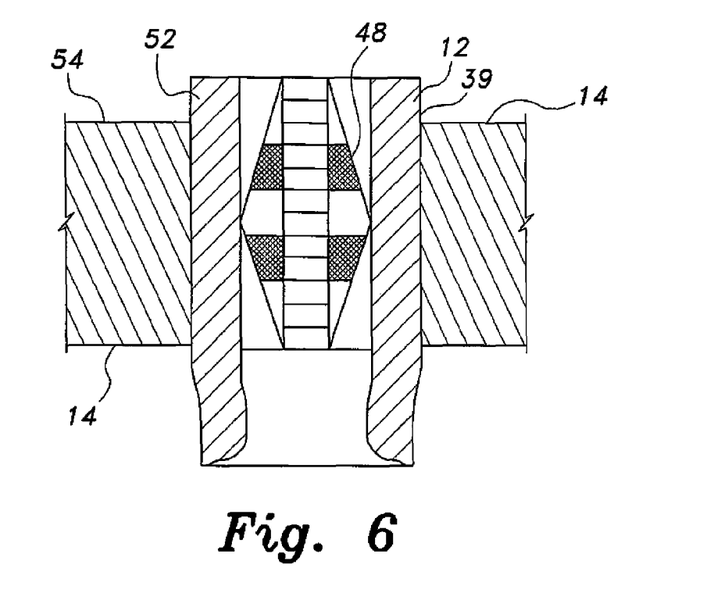
FIG. 6 is an environmental side view in section showing an expansion plug inserted into a tube and engaging the inner tube wall to support and stabilize the tube while positioned in the tubesheet prior to welding.
Figure 7:
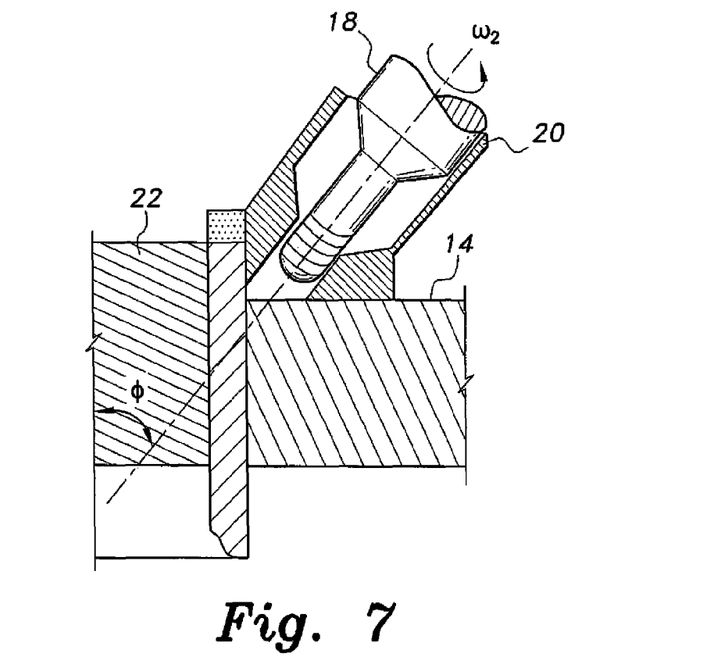
FIG. 7 is an environmental side view in section of the tool of FIG. 1, illustrating the insertion of the stir welding probe into the shoulder with the shoulder positioned in engaging relation to the tube and tubesheet.
Figure 8:
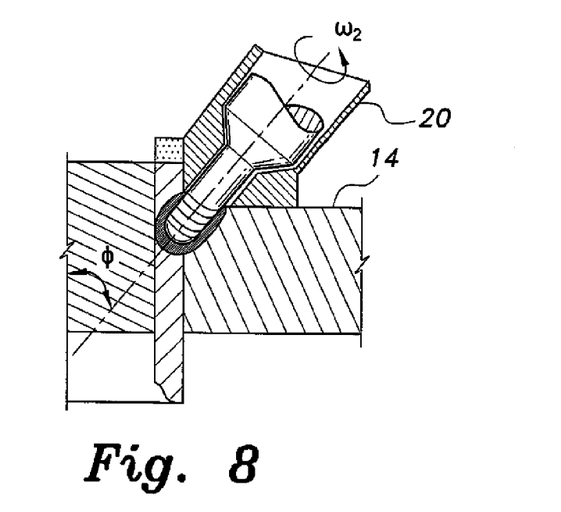
FIG. 8 is an environmental side view in section of the tool of FIG. 1, illustrating the shoulder with the stir welding probe inserted therein during friction stir welding.
Figure 9:
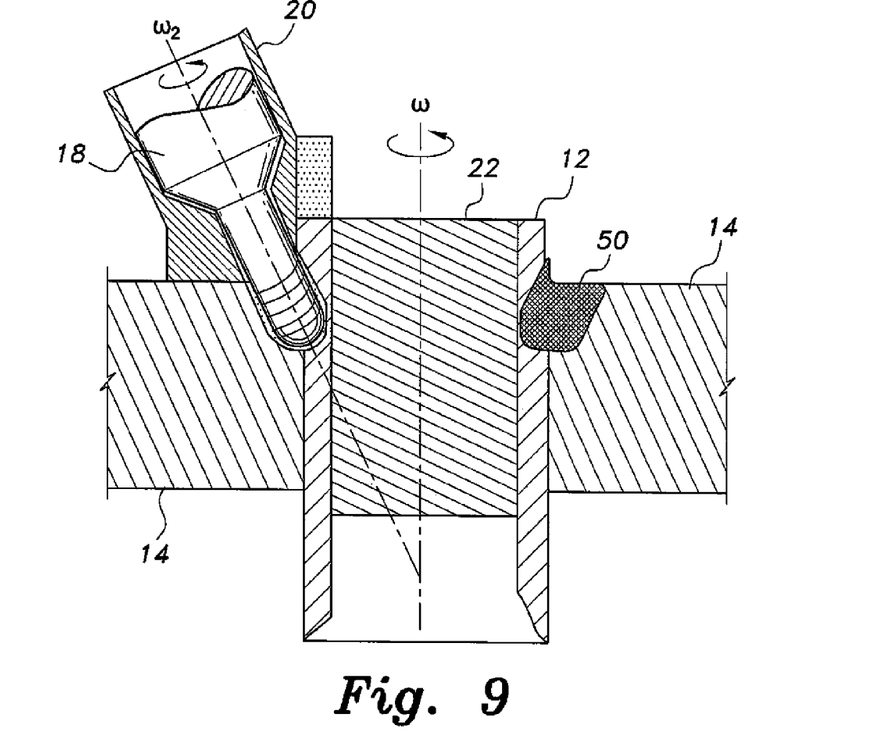
FIG. 9 is an environmental side view in section of the tool of FIG. 1, illustrating the relationship between the rotational axis of the shoulder and the rotational axis of the probe.

As shown in FIGS. 6 and 7, a tube plug 22 may be inserted into the tube 12 during the welding process. The tube plug 22 may have an outer diameter substantially equal to the inner diameter of the tube 12. The tube plug 22 retains the structural integrity of the tube 12 during the welding process, and may also provide a bearing surface for the inner face 36 of the shoulder 20 when the tube 12 is to be welded flush with the surface of the tubesheet 14.

Figure 10:
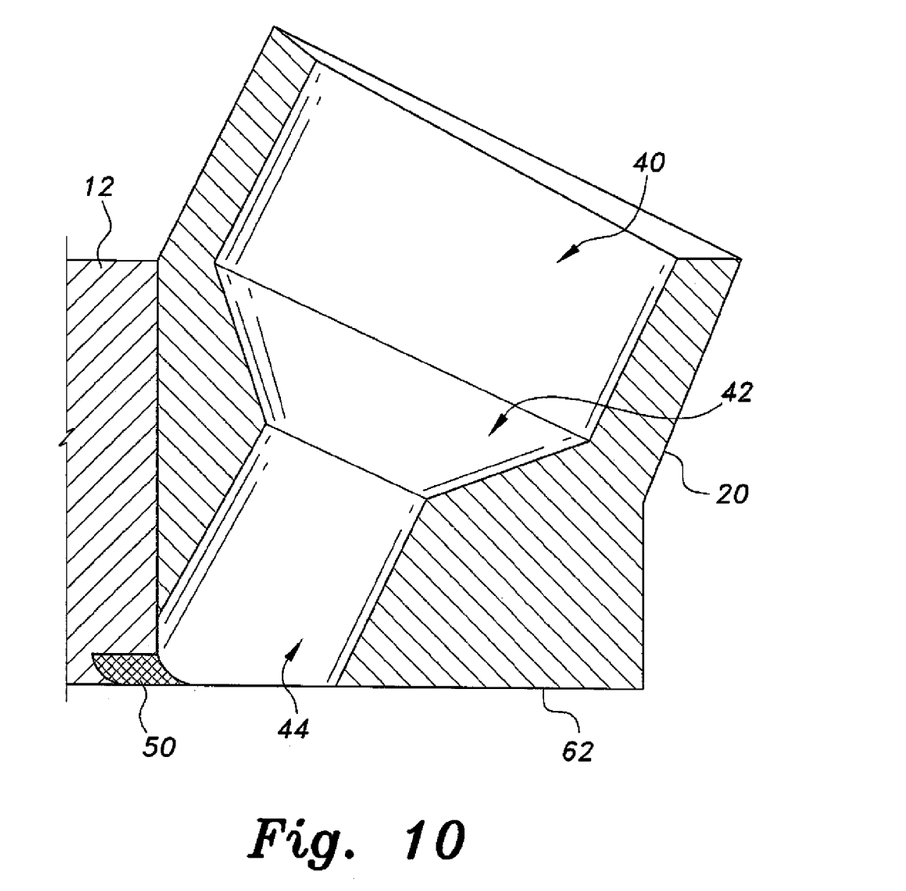
FIG. 10 is a side view in section of the tool of FIG. 1, illustrating a fillet formed in the shoulder at the junction of orthogonal faces of the shoulder.

As shown in FIG. 10, the inner corner of the shoulder 20 may have a fillet-radius formed at the juncture of the inner face 36 and the bottom face. The radius forms a fillet weld 50, which reduces the sharpness of the weld and reduces stress concentration on the weld seal 50.

In use, the tool 10 for friction stir welding provides for a solid-state joining process via a friction stir welding, in conjunction with a conventional friction stir welding apparatus. In general, during the friction stir welding process, heat is generated between the stir welding probe 18 at the junction of the tube 12 and tubesheet 14. As a forging force is applied by the shoulder 20 on the tube 12 and tubesheet 14, a very soft plastic region is created in the metal. The stir welding probe 18 mechanically mixes the plasticized tube and tubesheet metal at the intersection 16 to form a weld.

The tube 12 is inserted into an aperture 52 formed in the tubesheet 14 (such as a heat exchanger tubesheet) so that the outer walls 39 of the tube 12 engage the inner walls of the aperture 52 of the tubesheet 14 at the intersection 16. As shown in FIG. 6, for example, after insertion of the tube 12 in the tubesheet 14, a portion of the tube 12 extends generally outward beyond the surface 54 of the of the tubesheet 14. Notably, the method for forming a friction stir welding is suitable also when the tube 12 is flush with the tubesheet 14 as well.

The tube 12 is positioned in the tubesheet 14, and the tube 12 is then expanded, sealing the tube 12 outer wall 39 against the inner wall of the aperture 52. Expansion of the tube 12 may be achieved through methods generally known in the art, such as and expansible tube plug 22.

The tube 12 is expanded, e.g., by an expansion device 48, and the plug 22 is inserted to support the inner wall of the tube 12. Subsequent to plugging the tube 12 with the tube plug 22, the tool 10 is placed in operative connection with the tube 12 and tubesheet 14. The inner face 36 of the shoulder 20 engages the outer wall 39 of the tube 12, and the bottom face 68 of the shoulder 20 engages the surface 54 of the tubesheet 14. Accordingly, the aperture 44 is placed in alignment proximate to the intersection 16 of the tube 12 and the tubesheet 14.

Figure 11:
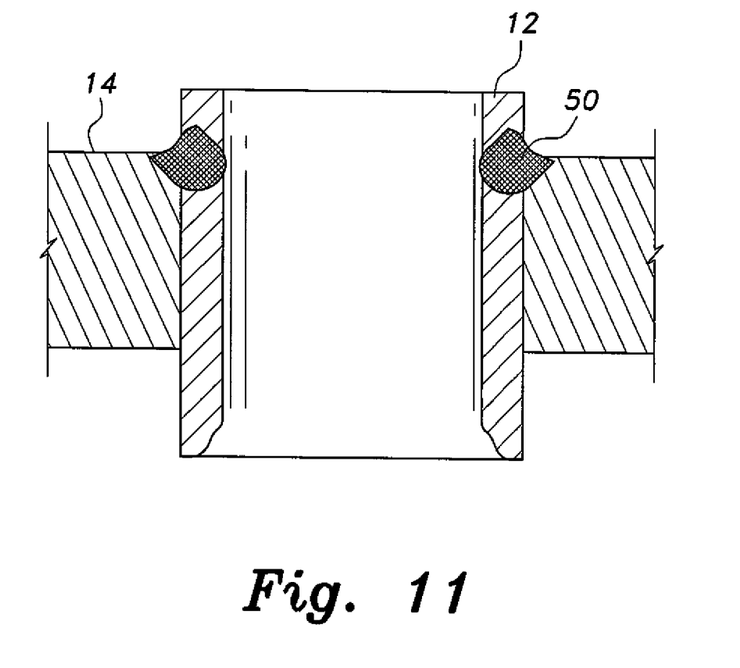
FIG. 11 is a side view of the tube and tubesheet after completion of friction stir welding according to the present invention, showing the weld sealing the tube to the tubesheet.

Thereafter, the stir welding probe 18 is introduced to the bore 38 of the shoulder 20. As illustrated in FIG. 7, the axis of the stir welding probe 18 relative to the tube 12 is at an oblique angle $\Phi$. During welding, forging forces are applied to the shoulder 20. A downward force is applied by the associated welding apparatus on the stir welding probe 18. The stir welding probe 18 is rotated by a motor, rotating the pin 24 at a preselected angular velocity of $\omega_2$. As welding proceeds, the shoulder 20 and probe 18 are rotated around the circumference of the tube 12 at a welding speed $\omega$ to form a friction weld seal 50 between the tube 12 and the tubesheet 14, as shown in FIG. 11.

It is to be understood that the present invention is not limited to the embodiments described above, but encompasses any and all embodiments within the scope of the following claims.

We claim:

1. A tool for friction stir welding, comprising:
   a shoulder having a planar bottom face and an arcuate inner face extending substantially orthogonal to the bottom face, the shoulder having a bore defined therein extending obliquely through the shoulder and terminating in an aperture defined proximate the junction of the bottom face and the inner face, the bottom face being adapted to apply a forging load against a tubesheet and the inner face being dimensioned and configured for rotation about a tube extending through an aperture in the tubesheet; and
   a stir welding probe insertable into the bore in the shoulder, the probe having a pin extendable through the aperture proximate the inner face and the bottom face of the shoulder, the probe being adapted for rotation by a motorized friction stir welding apparatus,
   whereby rotation of the probe forms a friction weld between the tube and the tubesheet and rotation of the shoulder about the tube during welding forms a weld joint seal around the tube.

2. The tool for friction stir welding according to claim 1, wherein the pin has helical threads defined therein for better metal flow and lower welding forces.

3. The tool for friction stir welding according to claim 1, wherein said probe has a cylindrical body adapted for gripping by the motorized friction stir welding apparatus and a frustoconical portion extending from the cylindrical body, the pin extending from the frustoconical portion.

4. The tool for friction stir welding according to claim 3, wherein the bore defined in said shoulder has a cylindrical upper portion dimensioned and configured for receiving the cylindrical body of said probe, a frustoconical recess extending from the upper portion, and a lower pin-receiving portion extending from the frustoconical recess and terminating in the aperture.

5. The tool for friction stir welding according to claim 1, wherein said shoulder has a body forming substantially a 90° sector of a cylindrical shell.

6. The tool for friction stir welding according to claim 1, wherein the bore in said shoulder defines an inner corner at the junction of the bottom face and the inner face, the inner corner having a radius adapted for forming a fillet weld.

7. A method for friction stir welding a tube to a tubesheet, comprising the steps of:

inserting a cylindrical tube into an aperture in a tubesheet, the tube extending substantially orthogonal to the tubesheet;

abutting a shoulder against the tube and the tubesheet, the shoulder having an inner face having a radius of curvature substantially equal to the tube and a planar bottom face adapted for abutting the tubesheet, the shoulder having an oblique bore defined therein terminating in an aperture proximate the junction of the inner face and the bottom face;

inserting a probe into the bore, the probe having a pin extending through the aperture to the junction of the tube and the tubesheet;

rotating the probe to generate friction between the probe, the tube, and the tubesheet while applying a forging load to the shoulder, thereby forming a friction weld between the tube and the tubesheet; and rotating the shoulder about the tube to seal the weld around the tube.

8. The method for friction stir welding according to claim 7, further comprising the step of inserting an expansion plug into the tube to maintain integrity of the tube during welding.

9. The method for friction stir welding according to claim 8, wherein said step of abutting the shoulder against the tube and the tubesheet comprises abutting the inner face of the shoulder against the expansion plug to weld the tube flush to the tubesheet.

10. The method for friction stir welding according to claim 7, wherein the weld comprises a fillet weld.

\* \* \* \* \*